United States Patent [19]

Wauke et al.

[11] Patent Number: 4,913,500
[45] Date of Patent: Apr. 3, 1990

[54] BICYCLE HUB

[75] Inventors: Tsukasa Wauke, Matsubara; Hiroyuki Noami, Wakayama, both of Japan

[73] Assignee: Maeda Industries, Ltd., Osaka, Japan

[21] Appl. No.: 272,107

[22] Filed: Nov. 15, 1988

[30] Foreign Application Priority Data

Nov. 17, 1987 [JP] Japan .................................. 62-291579

[51] Int. Cl.$^4$ ........................ B60B 27/02; F16H 27/02
[52] U.S. Cl. ............................. 301/105 B; 192/43.1; 192/48.92; 192/64
[58] Field of Search ....................... 301/105 R, 105 B; 192/43.1, 46, 48.92, 51, 64; 74/143; 280/237

[56] References Cited

U.S. PATENT DOCUMENTS 4,615,423 10/1986 Klauke et al. .............. 301/105 B X
4,766,772 8/1988 Tsuchie ...................... 192/48.92 X Primary Examiner—Russell D. Stormer
Attorney, Agent, or Firm—William H. Eilberg

[57] ABSTRACT

A bicycle hub comprises a hollow hub body rotatably supported on a hub shaft, a drive member rotatably supported on the hub shaft at one end of the hub body to receive a driving force, a slider disposed within the hub body for co-rotation with the drive member on the hub shaft but slidable axially of the hub shaft. The hub body are brought into driving engagement with the slider by a first ratchet mechanism in one rotational direction as well as by a second ratchet mechanism in the opposite rotational direction. The slider is axially moved by a change-over mechanism to bring selected one of the first and second ratchet mechanisms out of ratcheting operation.

10 Claims, 3 Drawing Sheets ratcheting condition;

BICYCLE HUB

BACKGROUND OF THE INVENTION

1. Field of the Invention:

This invention relates generally to bicycle hubs, and more particularly to a bicycle hub which is capable of selectively receiving a forward driving force or a backward driving force.

2. Description of the Prior Art:

As is well known, most bicycles are designed to be driven only forward while being also allowed to run idly forward without forward pedalling. For this purpose, one of the hubs (usually rear hub) for such a bicycle is provided with a freewheel which receives a pedalling force but co-rotates with the hub only in the forward rotational direction.

More specifically, a typical freewheel comprises an inner ring fixed to one end of a hub body, and an outer sprocket ring surrounding the inner ring. The sprocket ring is internally formed with a circumferential series of ratchet teeth, whereas the inner ring externally carries a diametrically opposite pair of ratchet pawls which is spring-biased for driving engagement with the ratchet teeth only in the forward rotational direction but passes by the ratchet teeth in the opposite or backward rotational direction. Thus, the forward pedalling force exerted by the cyclist is transmitted to the hub via the freewheel, whereas the backward pedalling of the cyclist results in idle backward rotation of the sprocket ring of the freewheel. Further, the hub can freely rotate in the forward rotational direction to enable idle or inertial forward running of the bicycle without forward pedalling.

The conventional bicycle, which is capable of running only forward, is satisfactory for most purposes. However, such a bicycle is not suitable for particular purposes such as bicycle moto-cross.

Bicycle moto-cross, which has becoming increasingly popular, is a sport event in which the participants compete in their skill of riding in bad road conditions. In one program called "free-style", particularly, each competitor tries to do an excellent and impressive performance by making acrobatic movements which naturally include both forward and backward movements.

With the conventional bicycle, however, the rider can make only forward driving. Therefore, the only way for the rider to make a backward movement is to first go up a slope by forward running to subsequently go down, without a directional change of the bicycle, by utilizing a gravitational acceleration. Obviously, the backward movement obtained in this way causes the bicycle pedals to rotate in the backward rotational direction, consequently giving a danger to the rider.

It is possible to achieve backward driving by the hub with a freewheel which includes an outer sprocket ring co-rotatable, via a reverse ratchet mechanism, with an associated inner ring (i.e., the hub fixed thereto) only in the backward rotational direction. Such a freewheel also enables idle or inertial backward running without forced backward pedal rotation.

The above solution, however, results in inability of driving forward which basically is more imporant than driving backward. Obviously, an excellent performance in a free-style program of the bicycle moto-cross is possible only by dynamic combination of forward and backward movements. Therefore, the reverse working freewheel is disadvantageous for the purpose of bicycle moto-cross as well as for normal use.

SUMMARY OF THE INVENTION

It is, therefore, an object of the invention to provide a novel bicycle hub which is capable of providing selectivity between a forward driving mode and a backward driving mode.

Another object of the invention is to provide such selectivity with a simple arrangement.

According to the invention, there is provided a bicycle hub comprising: a hollow hub body rotatably supported on a hub shaft; a drive member rotatably supported on the hub shaft at one end of the hub body to receive a driving force; a slider disposed within the hub body for co-rotation with the drive member on the hub shaft, the slider being slidable axially of the hub shaft; a first ratchet mechanism provided between the hub body and the slider for bringing the hub body into driving engagement with the slider in one rotational direction while allowing relative rotation therebetween in the opposite rotational direction; a second ratchet mechanism spaced from the first ratchet mechanism axially of the hub shaft and provided between the hub body and the slider for bringing the hub body into driving engagement with the slider in said opposite rotational direction while allowing relative rotation therebetween in said one direction; change-over means for axially moving the slider; and disengaging means for bringing at least selected one of the first and second ratchet mechanisms out of ratcheting operation in response to axial movement of the slider.

Other objects, features and advantages of the invention will be fully understood from the following detailed description given with reference to the accompanying drawing.

DETAILED DESCRIPTION

Figure 1:
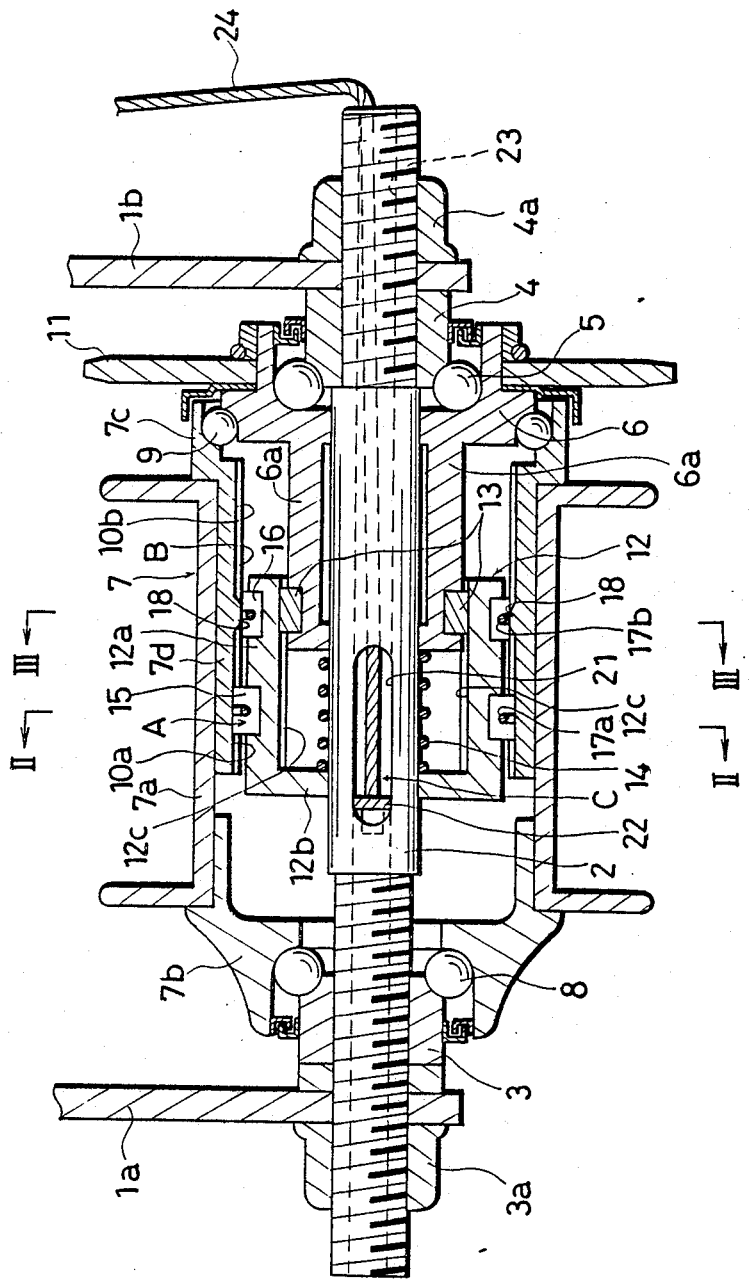
FIG. 1 is a view, in longitudinal section, showing a bicycle hub embodying the invention.

Referring to FIG. 1 of the accompanying drawings, there is illustrated a bicycle hub which comprises a hub shaft 2 fixed at both ends to a pair of bicycle fork ends 1a,1b. Specifically, one end of the hub shaft 2 is screwed to a first ball presser 3 and a cooperative nut 3a,and fixed to a corresponding fork end 1a by clamping it between the presser 3 and the nut 3a. Similarly, the other end of the hub shaft 2 is screwed to a second ball presser 4 and a cooperative nut 4a,and fixed to the other fork end 1b by clamping it between the presser 4 and the nut 4a.

The first ball presser 3 also serves as an inner race for a first set of balls 8. Similarly, the second ball presser 4 also works as an inner race for a second set of balls 5. A sprocket mount 6, which externally carries a sprocket 11, not only serves as an outer race for the second set of balls 5 but also functions as an inner race for a third set of balls 9. A hub body generally indicated by reference numeral 7 is rotatably supported by the first and third ball sets 8, 9.

The hub body 7 includes a tubular hub shell 7a, a first end member 7b fixed to one end of the hub shell to serve as an outer race for the first set of balls 8, and a second end member 7c fixed to the other end of the hub shell to serve as an outer race for the third set of balls 9. The second end member 7c has a tubular extension 7d press-fitted in the hub shell 7a. The tubular extension 7d is internally formed with a first circumferential series of axially extending ratchet teeth 10a (see also FIG. 2) as well as with a second circumferential series of axially extending ratchet teeth 10b (see also FIG. 4). The hub shell 7a may be made of a light metal to realize overall weight reduction.

The sprocket (rear gear) 11 fixed on the sprocket mount 6 is connected to an unillustrated chain which in turn is connected to an unillustrated chainwheel (front gear). Therefore, the sprocket mount 6 is rotated by the pedalling action of the cyclist. Of course, the single sprocket 11 may be replaced by a known multiple sprocket (not shown) to provide an ability for speed change.

The sprocket mount 6 has a tubular extension 6a positioned within the tubular extension 7d of the second end member 7c. The tubular extension 6a of the sprocket mount 6 is provided with a diametrical opposite pair of keys 13, as better illustrated in FIG. 3.

Within the hub body 7 is arranged a slider 12 which has a cylindrical wall 12a and a bored side wall 12b. The bored side wall 12b is slidably fitted on a non-threaded intermediate portion of the hub shaft 2. The cylindrical wall 12a is disposed between the tubular extension 6a of the sprocket mount 6 and the tubular extension 7d of the second end member 7c, and internally formed with a diametrically opposite pair of axially extending key grooves 12c for engagement with the keys 13 of the sprocket mount 6 (see also FIG. 3). Thus, the slider 12 is co-rotatable with the sprocket mount 6 but axially slidable relative thereto. A compression coil spring 14 is interposed between the tubular extension 6a of the sprocket mount 6 and the side wall 12b of the slider 12, so that the slider 12 is always biased away from the sprocket mount 6.

The slider 12 externally carries a diametrically opposite pair of first ratchet pawls 15 and a diametrically opposite pair of second ratchet pawls 16. The first pawl pair 15 and the second pawl pair 16 are axially spaced from each other.

Figure 2:
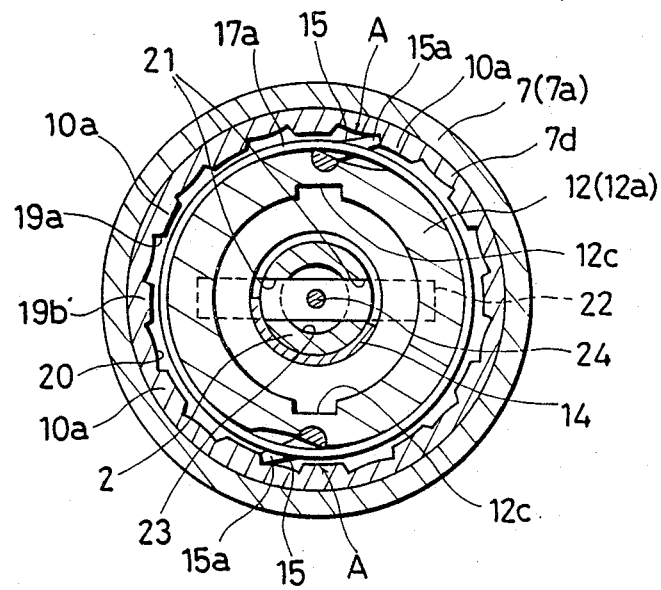
FIG. 2 is a sectional view taken on lines II—II in FIG. 1 and showing a first ratchet mechanism in a ratcheting condition.

As better illustrated in FIG. 2, each of the first ratchet pawls 15 is inclined in one rotational direction (clockwise in FIG. 2) and has a pawl tip 15a for driving engagement with the first series of ratchet teeth 10 to rotate the hub body 7 in the forward direction together with the sprocket mount 6. For this purpose, the first ratchet pawl 15 is always urged to its engaging position by a first ring spring 17a. On the other hand, the pawl 15 can move past the the first series of ratchet teeth 10a upon reverse or backward rotation of the sprocket mount 6, so that the pawl 15 cannot transmit any driving force in this rotational direction.

Figure 4:
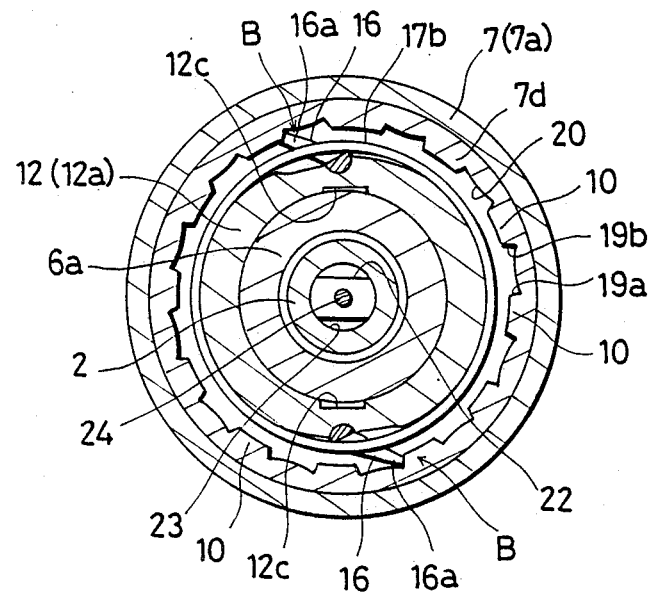
FIG. 4 is a sectional view similar to FIG. 2 but showing the second ratchet mechanism in a ratcheting condition.

As apparent from FIG. 4, each of the second ratchet pawls 16 is inclined in a rotational direction (counter-clockwise in FIG. 4) opposite that of the first ratchet pawls 15 and has a pawl tip 16a for driving engagement with the second series of ratchet teeth 10b to rotate the hub body 7 in the backward direction together with the sprocket mount 6. For this purpose, the second ratchet pawl 16 is always urged to its engaging position by a second ring spring 17b. On the other hand, the pawl 16 can move past the second series of ratchet teeth 10b upon forward rotation of the sprocket mount 6, so that the pawl 16 cannot transmit any driving force in this rotational direction.

According to the illustrated embodiment, the ratchet teeth 10a, 10b, which are spaced circumferentially of the hub shell 7a by intervening ratchet grooves 20, are trapezoidal in cross section (see FIGS. 2 and 4) to provide first and second lateral walls 19a, 19b. The first lateral wall 19a of each first series ratchet tooth 10a is used for driving engagement with the first ratchet pawls 15, whereas the second lateral wall 19b of each second series ratchet tooth 10b is used for driving engagement with the second ratchet pawls 16.

Figure 3:
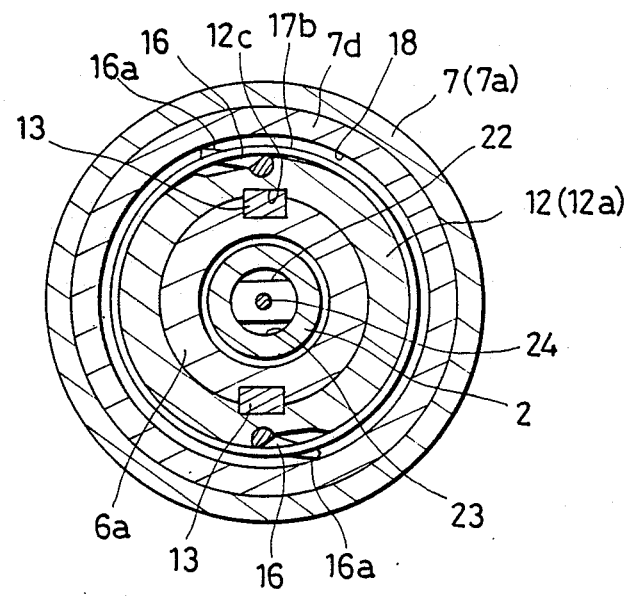
FIG. 3 is a sectional view taken on lines III—III in FIG. 1 and showing a second ratchet mechanism in a non-ratcheting condition.

As illustrated in FIGS. 1 and 3, the tubular extension 7d of the second end member 7c is internally formed at an axially intermediate position thereof with an annular bulge 18 which separates between the first series of ratchet teeth 10a and the second series of ratchet teeth 10b. The annular bulge 18 can selectively come into sliding contact with the first ratchet pawls 15 or the second ratchet pawls 16 by axial movement of the slider 12 relative to the sprocket mount 6. When the second ratchet pawls 16 for example are brought into sliding or non-ratcheting contact with the annular bulge 18, they no longer transmit any driving force to the hub body 7 in both forward and backward rotational directions, as can be easily appreciated from FIG. 3. The same is also true with respect to the first ratchet pawls 15.

On one side of the annular bulge 18, the first series of ratchet teeth 10a provide a first ratchet mechanism A in combination with the first ratchet pawls 15. On the other side of the annular bulge 18, similarly, the second series of ratchet teeth 10b form a second ratchet mechanism B in combination with the second ratchet pawls 16.

As described above, the annular bulge 18 may be selectively brought into contact with the first ratchet pawls 15 or the second ratchet pawls 16 by axial movement of the slider 12. Such axial movement of the slider 12 can be effected by means of a change-over mechanism C, as described below.

As shown in FIGS. 1 and 2, the change-over mechanism C mainly comprises a presser bar 22 and a control cable 24. The control cable 24 is introduced axially into the hub shaft 2 through an axial bore 23 for connection at one end to the presser bar 22. The other end of the control cable 24 is connected to a control lever (not shown) mounted for example on the bicycle handle bar. The presser bar 22 penetrates transversely through the hub shaft 22 to engage with the side wall 12b of the slider 12. For this purpose, the hub shaft 2 has a diametrically opposite pair of elongated guide openings 21 for allowing the presser bar 22 to extend out while permitting it to move axially of the hub shaft. Thus, when the control cable 24 is pulled by the unillustrated control lever, the presser bar 22 causes the slider 12 to move axially against the biasing force of the compression spring 14.

FIG. 1 represents a forward driving position in which the first ratchet pawls 15 are in driving engagement with the first series of ratchet teeth 10a (FIG. 2), whereas the second ratchet pawls 16 are in sliding contact with the annular bulge 18 (FIG. 3). In this position, the slider 12 can transmit the driving force of the sprocket mount 6 to the hub body 7 only in the forward rotational direction. Thus, the bicycle can be driven forward by forward pedalling. On the other hand, backward pedalling results in idle backward rotation of the sprocket mount 6 relative to the hub body 7. Of course, the hub body 7 can freely rotate in the forward direction (clockwise in FIG. 2) relative to the sprocket mount 6, thereby enabling idle forward running of the bicycle without driving rotation of the sprocket mount 6.

When the control cable 24 is pulled by the unillustrated control lever, the slider 12 together with the presser bar 22 moves rightward in FIG. 1 to assume a backward driving position (not shown) in FIG. 1 in which the second ratchet pawls 16 come into driving engagement with the second series of ratchet teeth 10b (FIG. 4), whereas the first ratchet pawls 15 come into sliding or idle contact with the annular bulge 18. In this position, the slider 12 can transmit the driving force of the sprocket mount 6 to the hub body 7 only in the backward rotational direction (counterclockwise in FIG. 4) relative to the sprocket mount 6. Therefore, the bicycle can be driven backward by backward pedalling, while forward pedalling results in idle forward rotation (clockwise in FIG. 4) of the sprocket mount 6. Of course, the hub body 7 can freely rotate in the backward direction relative to the sprocket mount 6, thereby enabling idle or inertial backward running of the bicycle without driving rotation of the sprocket mount 6.

When the tension on control cable 24 is relieved, the slider 12 will automatically return to the forward driving position (FIG. 1) by the elastic restoring action of the compression spring 14.

Preferably, the elongated guide openings 21 should be so sized and positioned that the slider 12 assumes the forward driving position of FIG. 1 when the presser bar 22 is located at one end (left end in FIG. 1) of each guide opening 21, while the slider 12 takes the backward driving position when the presser bar 22 is disposed at the other end (right end in FIG. 1). As is apparent, such an arrangement facilitates a change-over operation between the forward and backward driving positions.

According to the illustrated embodiment, the slider 12 may be brought to an intermediate position in which the first ratchet pawls 15 and the second ratchet pawls 16 respectively come into driving engagement with the first series of ratchet teeth 10a and the second series of ratchet teeth 10b on both sides of the annular bulge 18. In this position, the hub body 7 is drivingly rotated by the sprocket mount 6 in both forward and backward directions, consequently enabling the bicycle to be driven forward and backward by forward and backward pedalling, respectively.

According to the present invention, it is possible to select between the forward driving mode and the backward driving mode depending on various requirements. Particularly, in a free-style bicycle moto-cross competition, the competitor can make an excellent and dynamic performance by combining forward and backward movements.

The annular bulge 18 may be replaced by any annular smooth surface which provides sliding or non-ratcheting contact with the ratchet pawls 15, 16. For example, the annular bulge 18 may be replaced by and annular groove (not shown) whose bottom surface provides a smooth contact with the ratchet pawls 15, 16.

The tubular extension 7d of the second en member 7c may be modified to be internally provided with an axially spaced pair of annular non-ratcheting portions for sliding contact with the ratchet pawls 15, 16. In such a modification, both of the first and second ratchet pawls 15, 16 can be brought out of driving engagement with the ratchet teeth 10 to realize a neutral mode in addition to the forward and backward driving modes.

One of the first ratchet pawls 15 may be obviated although the provision of two such ratchet pawls is advantageous in view of operational balance. Similarly, one of the second ratchet pawls 16 may be omitted.

The invention being thus described, it is obvious that the same may be further varied in many ways. For instance, the hub body 7, which consists of three separate parts 7a, 7b, 7c according to the illustrated embodiment, may be made of a single piece. Such variations are not to be regarded as a departure from the spirit and scope of the invention, and all such modifications as would be obvious to those skilled in the art are intended to be included within the scope of the following claims.

We claim:

1. A bicycle hub comprising:
   a hollow hub body rotatably supported on a hub shaft and having a substantially cylindrical inner surface, said inner surface being formed with at least one annular sliding portion;
   a drive member rotatably supported on said hub shaft at one end of said hub body to receive a driving force;
   a slider disposed within said hub body for co-rotation with said drive member on said hub shaft, said slider being slidable axially of said hub shaft;
   a first ratchet mechanism including a first circumferential series of ratchet teeth formed on said inner surface of said hub body at one side of said sliding portion, said first ratchet mechanism further including at least one first ratchet pawl pivotally carried on said slider for movement therewith axially of said hub shaft, said first ratchet pawl coming into driving engagement with said first series of ratchet teeth to cause said slider to rotate with said hub body in one rotational direction while allowing said slider body to rotate idly relative to said hub body in the opposite rotational direction;
   a second ratchet mechanism including a second circumferential series of ratchet teeth formed on said inner surface of said hub body at the other side of said sliding portion, said second ratchet mechanism further including at least one second ratchet pawl pivotally carried on said slider for movement therewith axially of said hub shaft, said second ratchet pawl coming into driving engagement with said second series of ratchet teeth to cause said slider to rotate with said hub body in said opposite rotational direction while allowing said slider to rotate idly relative to said hub body in said one rotational direction; and
   change-over means for axially moving said slider to bring a selected one of said first and second ratchet pawls into sliding contact with said sliding portion.--

2. The bicycle hub as defined in claim 1, wherein said first ratchet pawl is inclined in said one rotational direction and spring-biased for driving engagement with said first series of ratchet teeth; and said second ratchet pawl is inclined in said opposite rotational direction and spring-biased for driving engagement with said second series of ratchet teeth.

3. The bicycle hub as defined in claim 2, wherein said annular sliding portion is in the form of an annular bulge.

4. The bicycle hub as defined in claim 2, wherein said hub body comprises a cylindrical hub shell, and an end member fixed to one end of said hub shell and having a tubular extension fitted into said hub shell; and said inner surface of said hub body is provided by said tubular extension.

5. The bicycle hub as defined in claim 1, wherein said drive member is in the form of a sprocket mount carrying at least one sprocket and has a tubular extension projecting into said hub body; and said slider has a cylindrical wall keyed to said tubular extension to be axially slidable thereon.

6. The bicycle hub as defined in claim 5, wherein said slider further has a bored side wall slidably fitted on said hub shaft; and a coil spring is interposed between said side wall of said slider and said tubular extension of said sprocket mount for axially biasing said slider away from said sprocket mount.

7. The bicycle hub as defined in claim 6, wherein said hub shaft has an axial bore, and an opposite pair of elongated lateral guide openings in communication with said axial bore; and said change-over means comprises a control cable introduced into said axial bore, and a presser bar connected to one end of said control cable and transversely penetrating said hub shaft through said guide openings to engage with said side wall of said slider.

8. The bicycle hub as defined in claim 1, wherein one end of said hub body is rotatably supported on said hub shaft by means of a first bearing; said drive member is rotatably supported on said hub shaft by means of a second bearing; and the other end of said hub body is rotatably supported on said drive member by means of a third bearing.

9. A bicycle hub comprising:
a hollow hub body rotatably supported on a hub shaft;
a drive member rotatably supported on said hub shaft at one end of said hub body to receive a driving force;
a slider disposed within said hub body for co-rotation with said drive member on said hub shaft, said slider being slidable axially of said hub shaft;
a first ratchet mechanism provided between said hub body and said slider for bringing said hub body into driving engagement with said slider in one rotational direction while allowing relative rotation therebetween in the opposite rotational direction;
a second ratchet mechanism spaced from said first ratchet mechanism axially of said hub shaft and provided between said hub body and said slider for bringing said hub body into driving engagement with said slider in said opposite rotational direction while allowing relative rotation therebetween in said one direction;
change-over means for axially moving said slider; and
disengaging means for bringing at least selected one of said first and second ratchet mechanisms out of ratcheting operation in response to axial movement of said slider,
wherein said drive member is in the form of a sprocket mount carrying at least one sprocket and has a tubular extension projecting into said hub body; and said slider has a cylindrical wall keyed to said tubular extension to be axially slidable thereon,
wherein said slider further has a bored side wall slidably fitted on said hub shaft; and a coil spring is interposed between said side wall of said slider and said tubular extension of said sprocket mount for axially biasing said slider away from said sprocket mount.

10. The bicycle hub as defined in claim 9, wherein said hub shaft has an axial bore, and an opposite pair of elongated lateral guide openings in communication with said axial bore; and said change-over means comprises a control cable introduced into said axial bore, and a presser bar connected to one end of said control cable and transversely penetrating said hub shaft through said guide openings to engage with said side wall of said slider.

* * * * *